(12) United States Patent
Bushnell

(10) Patent No.: US 10,334,544 B2
(45) Date of Patent: Jun. 25, 2019

(54) PRECISION RELATIVE POSITIONING AND FREE SPACE TIME TRANSFER BETWEEN MOVING PLATFORMS

(71) Applicant: THE BOEING COMPANY, Chicago, IL (US)

(72) Inventor: Glenn S. Bushnell, Puyallup, WA (US)

(73) Assignee: THE BOEING COMPANY, Chicago, IL (US)

( * ) Notice: Subject to any disclaimer, the term of this patent is extended or adjusted under 35 U.S.C. 154(b) by 117 days.

(21) Appl. No.: 15/582,555

(22) Filed: Apr. 28, 2017

(65) Prior Publication Data
US 2018/0317184 A1 Nov. 1, 2018

(51) Int. Cl.
*H04L 7/00* (2006.01)
*H04W 56/00* (2009.01)
*G01S 11/08* (2006.01)

(52) U.S. Cl.
CPC ........... *H04W 56/001* (2013.01); *G01S 11/08* (2013.01); *H04L 7/0016* (2013.01); *H04L 7/0075* (2013.01)

(58) Field of Classification Search
CPC ... H04B 1/7073; H04B 7/2125; H04J 3/0617; H04J 3/0638; H04L 7/0016; H04L 7/0075; H04W 56/001; H04W 56/0025; H04W 56/0035; G01S 11/08
See application file for complete search history.

(56) References Cited

U.S. PATENT DOCUMENTS

| 7,639,769 | B2 * | 12/2009 | Lai | H03L 7/07 375/327 |
|---|---|---|---|---|
| 7,876,791 | B2 * | 1/2011 | Jung | H04J 3/0667 370/345 |
| 8,600,239 | B2 * | 12/2013 | Mani | H04J 14/0272 14/272 |
| 8,698,530 | B2 * | 4/2014 | Blondel | H04J 3/0632 327/162 |
| 8,774,337 | B2 * | 7/2014 | Lee | H03L 7/0814 375/355 |
| 9,143,312 | B2 * | 9/2015 | Taylor | H04L 7/0087 |
| 9,288,777 | B2 * | 3/2016 | Hollabaugh | H04W 56/0035 |
| 9,456,067 | B2 | 9/2016 | Rudow et al. | |
| 2008/0198836 | A1 * | 8/2008 | Sun | H04B 7/06 370/350 |
| 2016/0299221 | A1 | 10/2016 | Bushnell et al. | |
| 2017/0034797 | A1 * | 2/2017 | Parulkar | H04W 56/001 |
| 2018/0077530 | A1 * | 3/2018 | Mueggenborg | H04W 4/026 |

OTHER PUBLICATIONS

Moreira, et al.; Digital Dual Mixer Time Difference for Sub-Nanosecond Time Synchronization in Ethernet, IEEE, 2010, pp. 449-453 [Abstract Only] [Available Online] https://www.infona.pl/resource/bwmeta1.element.ieee-art-000005556289.

* cited by examiner

*Primary Examiner* — Alpus Hsu
(74) *Attorney, Agent, or Firm* — Patterson + Sheridan, LLP

(57) ABSTRACT

Aspects herein describe techniques for synchronizing clocks between two moving platforms (e.g., land vehicles, ships, aircraft, and the like) using optical signals generated from lasers. In one aspect, a method for mixing an intermediate signal with a local reference clock in a method of communicating between moving platforms includes mixing the intermediate signal with a sine representation of the local reference clock to generate a first offset error; mixing the intermediate signal with a cosine representation of the local reference clock to generate a second offset error; and combining the first and second offset errors to generate the fine phase offset.

6 Claims, 5 Drawing Sheets

PRECISION RELATIVE POSITIONING AND FREE SPACE TIME TRANSFER BETWEEN MOVING PLATFORMS

FIELD

This disclosure relates to relative timing and positioning measurements.

BACKGROUND

Relative positioning determines a location of a moving platform relative to one or more other platforms. Examples of moving platforms include land vehicles, ships, spacecraft, and aircraft. In some aspects, a position of a moving platform, such as an aircraft in flight, is determined relative to a non-moving platform, such as a stationary vehicle. In some instances, each of the platforms is a moving platform (e.g., two moving aircrafts or an aircraft and a ship or land vehicle).

Signals sent from respective platforms can be received and processed to determine distances between the platforms. Some techniques for determining relative positions of two or more platforms incorporate time transfer techniques, including two-way time transfer (TWTT). For example, a clock associated with each platform can record a time at which the platform sent a signal to another platform and a time at which the platform received a signal from other platform. The recorded time data can be used to calculate an offset or deviation between the clocks and to determine distances between the respective platforms and to prevent platform positioning errors due to time differences between the clocks of the respective platforms since each aircraft has two equations with two unknowns (i.e., the clock offset and the relative distance). In examples where the respective platforms are both moving, determining the relative positioning between the platforms involves consideration of parameters such as changing distances due to each platform being in motion.

SUMMARY

One aspect described herein is a method for mixing an intermediate signal with a local reference clock in a method of communicating between moving platforms, the method comprising: transmitting a first wireless signal from a first moving platform to a second moving platform, the first wireless signal comprising modulated data (i) indicating a first timestamp for a first clock operating in the first moving platform at a first frequency and (ii) identifying a timing pulse in the first wireless signal indicating when the first clock is at the first timestamp; receiving, at the first moving platform, a second wireless signal transmitted by the second moving platform, the second wireless signal comprising modulated data (i) indicating a second timestamp for a second clock operating in the second moving platform at a second frequency different from the first frequency and (ii) identifying a timing pulse in the second wireless signal indicating when the second clock is at the second timestamp; determining a first phase offset between the first clock and the second clock by evaluating the second timestamp, wherein determining the first phase offset between the first clock and the second clock comprises: identifying a coarse phase offset and a fine phase offset, wherein a value of the fine phase offset is less than a clock cycle of the second clock; wherein identifying the fine phase offset comprises: recovering the second clock at the first moving platform based on the second wireless signal; mixing the recovered clock with the first clock to identify an intermediate signal; and mixing the intermediate signal with a local reference clock in the first moving platform to identify the fine phase offset, wherein the first clock is synthesized from the local reference clock; and combining the coarse phase offset and the fine phase offset to yield the first phase offset; transmitting the first phase offset from the first moving platform to the second moving platform; receiving, at the first moving platform, a second phase offset transmitted by the second moving platform, wherein the second phase offset defines an offset between the first clock and the second clock relative to the second moving platform and is based on the first timestamp; and synchronizing the first clock and the second clock at the first moving platform based on the first and second phase offsets, wherein mixing the intermediate signal with the local reference clock comprises: mixing the intermediate signal with a sine representation of the local reference clock to generate a first offset error; mixing the intermediate signal with a cosine representation of the local reference clock to generate a second offset error; and combining the first and second offset errors to generate the fine phase offset.

Another aspect described herein is a method for determining a first phase offset between a first clock and a second clock in a method of communicating between moving platforms, the method comprising: transmitting a first wireless signal from a first moving platform to a second moving platform, the first wireless signal comprising modulated data (i) indicating a first timestamp for a first clock operating in the first moving platform at a first frequency and (ii) identifying a timing pulse in the first optical signal indicating when the first clock is at the first timestamp; receiving, at the first moving platform, a second optical signal transmitted by the second moving platform, the second optical signal comprising modulated data (i) indicating a second timestamp for a second clock operating in the second moving platform at a second frequency different from the first frequency and (ii) identifying a timing pulse in the second wireless signal indicating when the second clock is at the second timestamp; determining a first phase offset between the first clock and the second clock by evaluating the second timestamp, the method of determining the first phase offset between the first clock and the second clock comprises: identifying a coarse phase offset and a fine phase offset, wherein a value of the fine phase offset is less than a clock cycle of the second clock; and combining the coarse phase offset and the fine phase offset to yield the first phase offset; transmitting the first phase offset from the first moving platform to the second moving platform; receiving, at the first moving platform, a second phase offset transmitted by the second moving platform, wherein the second phase offset defines an offset between the first clock and the second clock relative to the second moving platform and is based on the first timestamp; and synchronizing the first clock and the second clock at the first moving platform based on the first and second phase offsets, the method of determining the first phase offset between the first clock and the second clock further comprising: recovering the second clock at the first moving platform based on the second wireless signal; identifying a difference between an edge of the first clock and an edge of the second clock over a predefined window of time greater than or equal to a beat period of local reference clock used to synthesize the first clock; and identifying an adjustment for the fine phase offset based on when the time difference between the edges of the first and second clocks is at a minimum.

Yet another aspect described herein is a method for mixing an intermediate signal with a local reference clock in a first moving platform, the first moving platform comprising: a pulse encoder configured to transmit a first wireless signal from a first moving platform to a second moving platform, the first wireless signal comprising modulated data (i) indicating a first timestamp for a first clock operating in the first moving platform at a first frequency and (ii) identifying a timing pulse in the first wireless signal indicating when the first clock is at the first timestamp; a recovery module configured to receive a second wireless signal transmitted by the second moving platform, the second wireless signal comprising modulated data (i) indicating a second timestamp for a second clock operating in the second moving platform at a second frequency different from the first frequency and (ii) identifying a timing pulse in the second wireless signal indicating when the second clock is at the second timestamp; and control logic configured to determine a first phase offset between the first clock and the second clock by evaluating the second timestamp, wherein the pulse encoder is further configured to transmit the first phase offset from the first moving platform to the second moving platform and the recovery module is further configured to receive a second phase offset transmitted by the second moving platform, wherein the second phase offset defines an offset between the first clock and the second clock relative to the second moving platform and is based on the first timestamp, wherein determining the first phase offset between the first clock and the second clock comprises: identifying a coarse phase offset and a fine phase offset, wherein a value of the fine phase offset is less than a clock cycle of the second clock, and wherein identifying the fine phase offset comprises: recovering the second clock at the first moving platform based on the second wireless signal; mixing the recovered clock with the first clock to identify an intermediate signal; and mixing the intermediate signal with a local reference clock in the first moving platform to identify the fine phase offset, wherein the first clock is synthesized from the local reference clock; and combining the coarse phase offset and the fine phase offset to yield the first phase offset, and wherein the control logic is configured to synchronize the first clock and the second clock at the first moving platform based on the first and second phase offsets, wherein mixing the intermediate signal with the local reference clock comprises: mixing the intermediate signal with a sine representation of the local reference clock to generate a first offset error; mixing the intermediate signal with a cosine representation of the local reference clock to generate a second offset error; and combining the first and second offset errors to generate the fine phase offset.

In yet another aspect described herein, a recovery module for recovering a second clock at a first moving platform based on a second wireless signal, the first moving platform comprising: a pulse encoder configured to transmit a first wireless signal from a first moving platform to a second moving platform, the first wireless signal comprising modulated data (i) indicating a first timestamp for a first clock operating in the first moving platform at a first frequency and (ii) identifying a timing pulse in the first wireless signal indicating when the first clock is at the first timestamp; a recovery module configured to receive a second wireless signal transmitted by the second moving platform, the second wireless signal comprising modulated data (i) indicating a second timestamp for a second clock operating in the second moving platform at a second frequency different from the first frequency and (ii) identifying a timing pulse in the second wireless signal indicating when the second clock is at the second timestamp; and control logic configured to determine a first phase offset between the first clock and the second clock by evaluating the second timestamp, wherein determining the first phase offset between the first clock and the second clock comprises: identifying a coarse phase offset and a fine phase offset, wherein a value of the fine phase offset is less than a clock cycle of the second clock; and combining the coarse phase offset and the fine phase offset to yield the first phase offset, wherein the pulse encoder is further configured to transmit the first phase offset from the first moving platform to the second moving platform and the recovery module is further configured to receive a second phase offset transmitted by the second moving platform, wherein the second phase offset defines an offset between the first clock and the second clock relative to the second moving platform and is based on the first timestamp, and wherein the control logic is configured to synchronize the first clock and the second clock at the first moving platform based on the first and second phase offsets, wherein the recovery module is configured to recover the second clock at the first moving platform based on the second wireless signal, and wherein the control logic is configured to: identify a difference between an edge of the first clock and an edge of the second clock over a predefined window of time greater than or equal to a beat period of local reference clock used to synthesize the first clock, and identify an adjustment for the fine phase offset based on when the difference between the edges of the first and second clocks is at a minimum.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
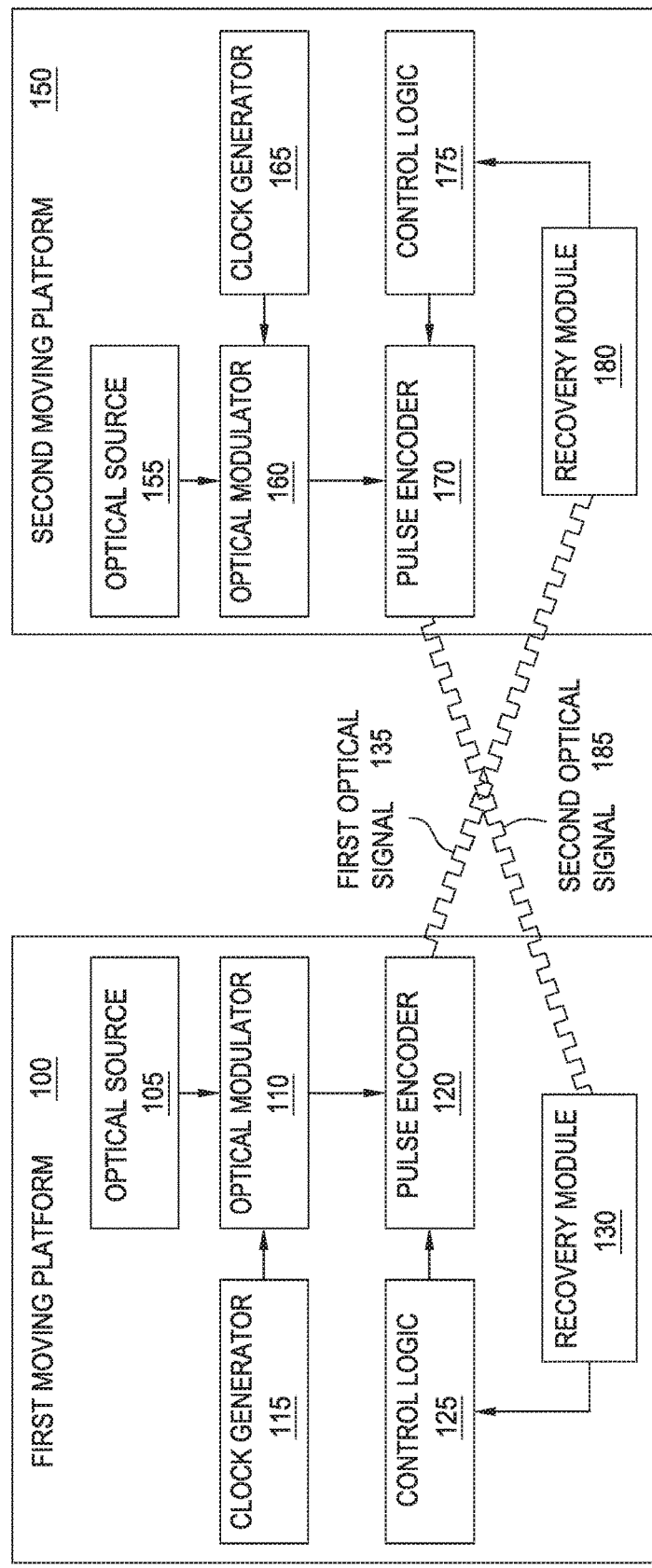
FIG. 1 illustrates a system for synchronizing clocks on two moving platforms.

Aspects herein describe techniques for synchronizing clocks between two moving platforms (e.g., land vehicles, ships, aircraft, spacecraft, satellites, and the like). While global positioning system (GPS) satellite signals can be used to synchronize the clocks, GPS signals can be jammed, and even when available, the accuracy of these signals is not sufficient for some applications. Instead, aspects herein describe using optical signals (e.g., wireless signals) generated from lasers to measure clock offsets and determine a separation distance between moving platforms. Once the clocks are synchronized (e.g., an offset between the clocks is determined), the moving platforms can share sensor data, location data, and other information which is dependent on accurate timestamps and relative positions (e.g., range plus azimuth/elevation (AZ/EL) from arrival angles). In one aspect, optical signals can be used to synchronize clocks with an accuracy of less than 10 picoseconds.

In one aspect, each of the moving platforms includes a continuous wave (CW) laser which is modulated to include at least one timestamp value (i.e., a particular value of a clock in the moving platform) and corresponding timing pulses. In one aspect, the data bits representing the timestamp value are transmitted before the corresponding timing pulse and indicate the value of the clock in a first moving platform at the timing pulse. When the optical signal is received by a second moving platform, that platform knows the value of the clock in the first moving platform when it transmitted the timing pulse. The second moving platform can also transmit coded optical signals to the first moving platform that includes a timestamp value and a timing pulse indicating when a clock on the second platform was at the timestamp value.

Both the first and second moving platforms can use the received timestamp values to calculate phase offsets between the recovered clocks and their local clocks. In one aspect, the moving platforms use the timing pulses and timestamp values to determine a coarse phase offset which is accurate up to, for example, a nanosecond. By mixing the recovered clocks with local clocks, the moving platforms can also determine fine phase offsets which can indicate a sub-nanosecond adjustment. By combining the coarse and fine phase offsets, the moving platforms can determine a total offset. However, the total offset is determined by at least two factors which are unknown. The first factor is the offset between the clocks and a global reference clock. For example, while the local clocks on the respective moving platforms can have initially been synched to the reference clock, the local clocks can drift by different amounts. The second factor that affects the total offset is the distance between the moving platforms. As the distance varies, the transmission delay—i.e., the time needed for the optical signals to propagate between the moving platforms—also varies.

To synchronize the clocks and determine the distance between the moving platforms, the platforms can transmit the total offsets to each other. With two calculated phase offsets, each of the moving platforms can use the offsets to, for example, determine the offsets between the clocks. Once that offset is known, the moving platforms can determine the separation distance. After synchronizing their clocks, the moving platforms can transmit and share time sensitive data. For example, the first moving platform can add timestamps to sensor data indicating when a sensor on the first moving platform captured the data. When the sensor data is received by the second moving platform (either by optical or other wireless means), the second moving platform can know within sub-nanosecond accuracy when that sensor data was captured by the first moving platform relative to its own clock.

FIG. 1 illustrates an optical communication system for synchronizing clocks on two moving platforms. In this aspect, the system includes a first moving platform 100 and a second moving platform 150. However, the system may include more than two moving platforms which can use the techniques described herein to synchronize their clocks. Further, in this example, each of the moving platforms contains the same components which perform the same function, and thus, only the components in the first moving platform 100 are described in detail.

The first moving platform 100 includes an optical source 105 (e.g., laser) which outputs an optical signal to an optical modulator 110. In one aspect, the optical modulator 110 is driven by a clock signal outputted by a clock generator 115. In one aspect, the optical modulator 110 uses the clock signal to modulate the optical signal to generate an optical clock. For example, the optical clock may include pulses output at a desired frequency. Although the optical signal is described herein as a sequence of pulses, the optical clock may be a square wave or any other suitable shape.

In one aspect, the frequency of the clock signal outputted by the clock generator 115 on the first moving platform 100 is different than the frequency of a clock signal outputted by a clock generator 165 on the second moving platform 150. For example, the clock generator 115 may output a 1 GHz clock signal which the optical modulator 110 uses to generate a 1 GHz optical clock. In contrast, the clock generator 165 may output a 0.99 GHz clock signal which an optical modulator 160 uses to generate a 0.99 GHz optical clock. The reason for using two different clock signals on the two moving platforms 100 and 150 is described in detail below.

The optical clock is provided to a pulse encoder 120 which uses a modulation scheme to encode digital data into the optical signal. As described in detail below, control logic 125 can encode a timestamp value of a local clock on the first moving platform 100 into the optical signal. Further, the control logic 125 can instruct the pulse encoder 120 to output a timing pulse (e.g., the optical modulator 110 generates the pulses while the encoder 120 encodes data on the pulse by modulating the carrier phase) in the optical signal when the local clock is at the timestamp value. The timestamp value is outputted before local clock actually reaches that value. Once the local clock does reach that value, the pulse encoder 120 outputs the timing pulse. Thus, in one aspect, the timestamp value is transmitted before the timing pulse and before the local clock reaches the value indicated in the timestamp. As a simple example, the pulse encoder 120 may output digital data indicating a known sequence (e.g., a preamble) followed by a timestamp value of 11:00 such that the final bit of the timestamp is sent with the pulse that corresponds to 11:00 (or some known number of pulses offset) when the local clock currently has a value of 10:59. The pulse encoder 120 then outputs the timing pulse when the local clock actually reaches a value of 11:00. In another aspect, the pulse encoder 120 may output further digital data identifying which future pulse corresponds to the timestamp value of 11:00. For example, after transmitting the timestamp value, the pulse encoder 120 may output a series of pulses and use the digital data to indicate which pulse is the timing pulse (i.e., the fifth pulse in a string of pulses that follow the digital data).

The second moving platform 150 as includes an optical source 155, an optical modulator 160, a clock generator 165, a pulse encoder 170, and a control logic 175 for encoding timestamp values and timing pulses in a second optical signal 185. In this manner, the first and second moving platforms 100 and 150 can use optical signals to transmit digital data that includes timestamp values of their respective local clocks.

The first and second moving platforms 100 and 150 include respective recovery modules 130 and 180 for receiving the first and second optical signals 135 and 185. In one aspect, the recovery modules 130 and 180 recover the clock used by the other moving platform. That is, the recovery module 130 can determine that the second optical signal 185 was generated using a 0.99 GHz clock signal. In this aspect, the clock frequencies used by the two moving platforms are set at known frequency offsets from each other and the two platforms establish this setting at some point, but they may not be exact. Any differences from the frequency offset can be resolved by the moving platforms using the time transfer techniques described herein.

In addition to recovering the clock, the recovery module 130 decodes the data in the second optical signal 185. That is, the recovery module 130 can determine the timestamp value and the corresponding timing pulse in the second optical signal 185. By determining when the timing pulse was received relative to the clock on the first moving platform 100, the control logic 125 can identify an offset between its clock and the clock in the second moving platform 150. As mentioned above, this offset however is dependent on at least two factors—i.e., the offset between the clocks and the actual time (or each other) and the distance between the first and second moving platforms 100 and 150. Resolving these two unknown values using the system shown in FIG. 1 is described below.

Figure 2:
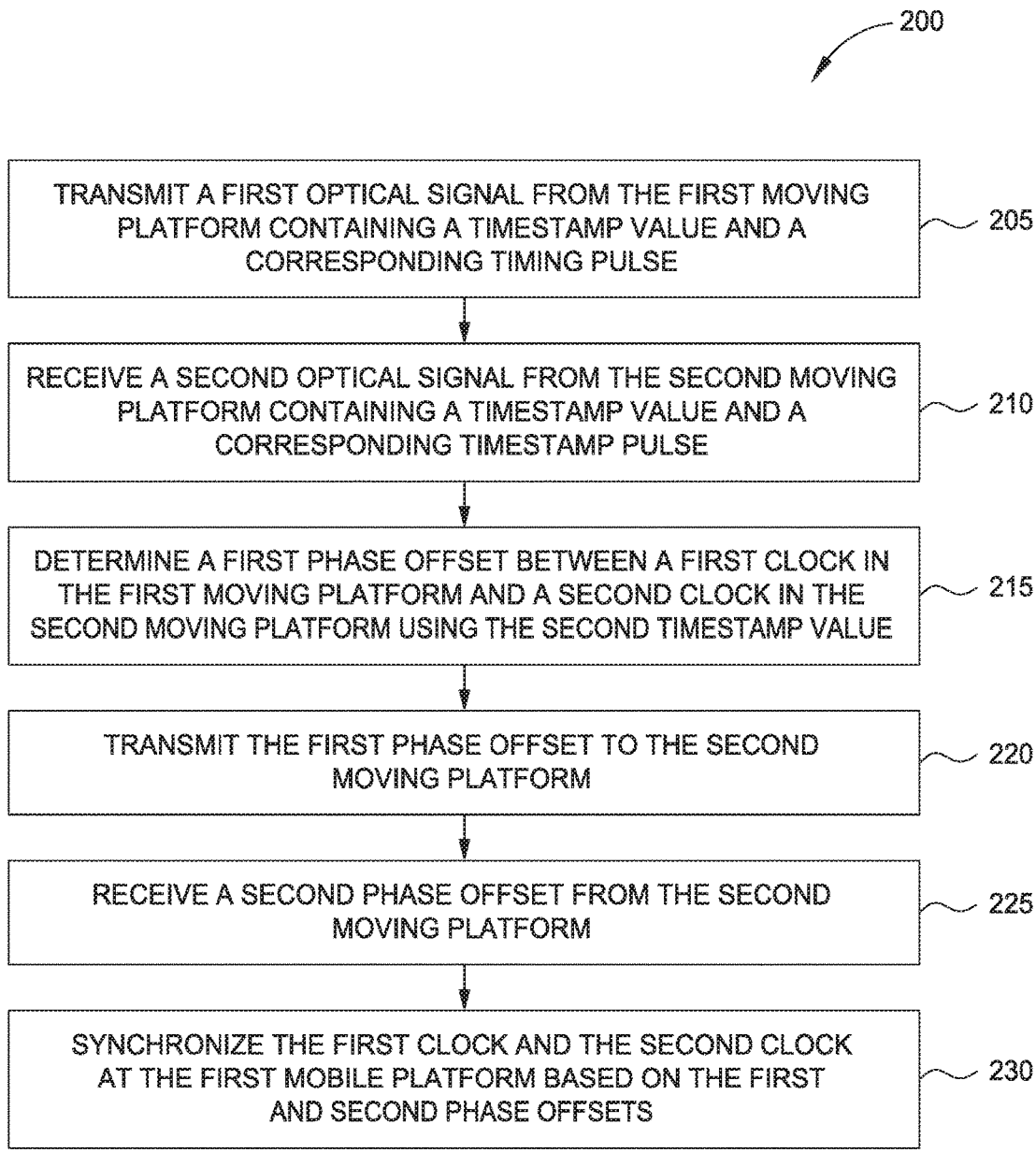
FIG. 2 is a flowchart for using optical signals to synchronize clocks on moving platforms.

FIG. 2 is a flowchart of a method 200 for using optical signals to synchronize clocks on moving platforms. At block 205, the first moving platform 100 transmits the first optical signal 135 to the second moving platform 150. In one aspect, the first moving platform 100 may transmit the first optical signal 135 in a variety of different directions. For example, the first optical signal 135 may be steered by pointing collimators or other types of optical steering devices such as a non-mechanical beam steering liquid crystal waveguide or microelectromechanical system (MEMS) steered mirrors. In one aspect, the first moving platform 100 may change the direction the first optical signal 135 is emitted until the moving platform 100 receives a response from the second moving platform 150 as described below.

The first optical signal 135 includes a timestamp value and a corresponding timing pulse. The first moving platform 100 first transmits encoded data in the first optical signal 135 that includes the timestamp value and then transmits the timing pulse when the local clock reaches the timestamp value. In one aspect, the first optical signal may include a plurality of timing pulses in which case the first moving platform 100 may include digital data in the optical signal 135 indicating which of the pulses corresponds to the timestamp value. Further, while the aspects herein described using a timing pulse as a marker indicating a particular value of the local clock, other signal characteristics can be used as a timing marker such as a leading edge or falling edge in the first optical signal 135.

In one aspect, the first moving platform 100 transmits a predefined preamble in the first optical signal 135 to indicate the start of a timestamp value. That is, the preamble may proceed the timestamp value in the first optical signal 135. Because the pattern of the preamble is known to both the first and second moving platforms 100 and 150, once the second moving platform 150 receives an optical signal with the preamble, the second moving platform 150 knows that the data following the preamble is a timestamp value of the clock in the first moving platform 100. Put differently, the preamble serves as a signal that a timestamp value and timing pulse are about to be sent by the first moving platform 100. In certain aspects, the preamble may include a repeating sequence of bits, such as a Baker sequence, which repeats at a user specified rate (e.g., every 10 or 100 MHz). In one aspect, the preamble is appended with the value of the timestamp (or clock count) of the local clock.

At block 210, the first moving platform receives the second optical signal 185 which contains a timestamp value and corresponding timing pulse of the second moving platform 150. In one aspect, the first moving platform 100 transmits the first optical signal 135 in parallel with the second moving platform 150 transmitting the second optical signal 185. Moreover, the first and second moving platforms 100 and 150 may transmit updated timestamp values at predefined intervals (e.g., every 10 or 100 MHz).

At block 215, the first moving platform 100 determines a first phase offset between a first clock in the first moving platform and a second clock in the second moving platform using the second timestamp value received from the second moving platform 150. When receiving the second optical signal 185, the recovery module 130 in the first moving platform 100 determines the timestamp value by decoding the data. Moreover, the recovery module 130 determines the timing pulse in the second optical signal 185 which corresponds to the timestamp value. Further, the first moving platform 100 can identify the value of its local clock at the time the timing pulse was received. Put differently, the first moving platform 100 identifies the value of the clock on the second moving platform 150 when the timing pulse was sent and the value of its local clock when the timing pulse was received. Subtracting the two values results in the first phase offset between the respective clocks in the first and second moving platforms 100 and 150. However, the first offset may not be an accurate measure of the offset between the respective clocks since the distance between the moving platforms may not be known and because the clocks may be offset relative to a standardized or reference time.

Figure 4:
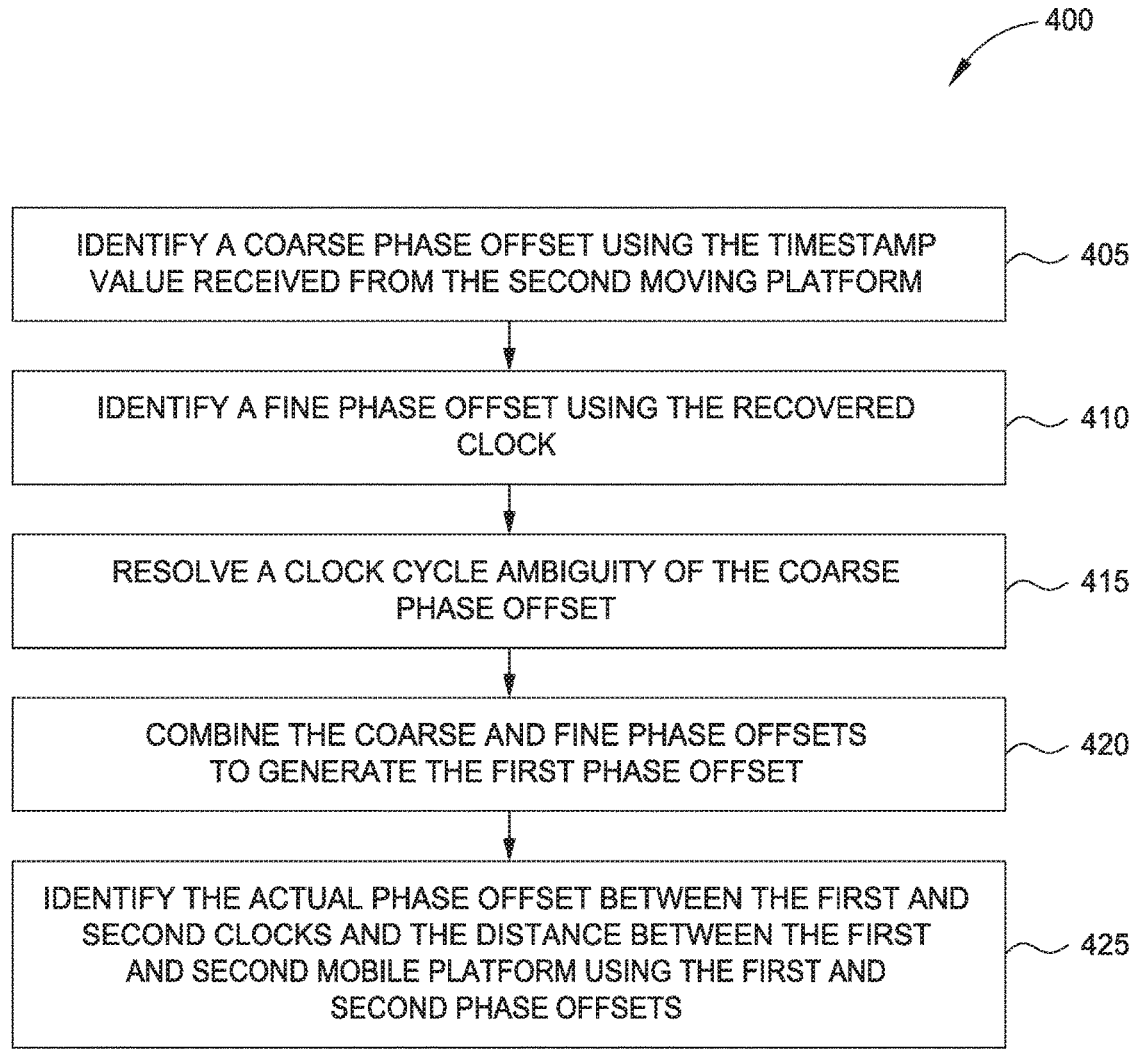
FIG. 4 is a flowchart for determining coarse and fine phase offsets between clocks on two moving platforms.

In one aspect, the first phase offset is derived by determining coarse and fine phase offsets which are described in more detail in FIG. 4. In one aspect, the coarse offset is derived directly from the timestamp values—e.g., the timestamp value transmitted by the second moving platform 150 and the value of the local clock that corresponds to when the timing pulse was received at the first moving platform 100—while the fine phase offset is determined by mixing a recovered clock derived from the second optical signal 185 with the local clock. In one aspect, the recovered clock has a different frequency than the local clock (e.g., 1 GHz versus 0.99 GHz).

At block 220, the first moving platform 100 transmits the first phase offset to the second moving platform 150. For example, the first moving platform 100 may encode the first phase offset into the first optical signal 135 which is received and decoded by the second moving platform 150. At block 225, the first moving platform 100 receives a second phase offset from the second moving platform 150. In one aspect, the second moving platform 150 performs the same process described at block 215 to determine the second phase offset except that the second phase offset is derived from the timestamp value transmitted by the first moving platform and the value of the local clock on the second moving platform 150 when the timing pulse was received.

At block 230, the first moving platform 100 synchronizes the first clock (i.e., its local clock) and the second clock on the second moving platform 150 using the first and second phase offsets. Put differently, the first moving platform 100 can use the first phase offset which is calculated locally and the second phase offset which is calculated by the second moving platform 150 to synchronize its local clock to the clock of the second moving platform 150. Furthermore, the second moving platform 150 can use the first and second phase offset to synchronize its local clock with the clock on the first moving platform 100.

As used herein, synchronizing the clocks on the moving platforms does not necessarily mean the local clocks are adjusted or changed at block 230 (although they could be). The first and second moving platforms 100 and 150 can determine at block 230 a clock adjustment or translation value for converting timestamps received by the other moving platform. For example, if the second moving platform 150 transmits sensor data from its radar system to the first moving platform 100, the first moving platform 100 can use the clock adjustment value to convert a timestamp (or timestamps) corresponding to the sensor data captured by the second moving platform 150 to a value of its local clock. The first moving platform 100 can then fuse the sensor data received from the second moving platform 150 with sensor data captured at the same time by the radar system on the first moving platform 100.

As described above, the first and second phase offsets may be insufficient by themselves for determining an accurate clock adjustment value because the offset between the clocks as well as the transmission delay due to the distance between the moving platforms are unknown. However, with two phase offsets, the first moving platform 100 essentially has two equations with two unknowns. The first moving platform 100 can use the first and second phase offsets to identify either the offset between the clocks or the distance between the moving platforms. With that information, the other unknown variable can be determined. In this manner, at block 230, the first and second moving platforms 100 and 150 can identify a clock adjustment value as well as a distance between the moving platforms.

Figure 3:
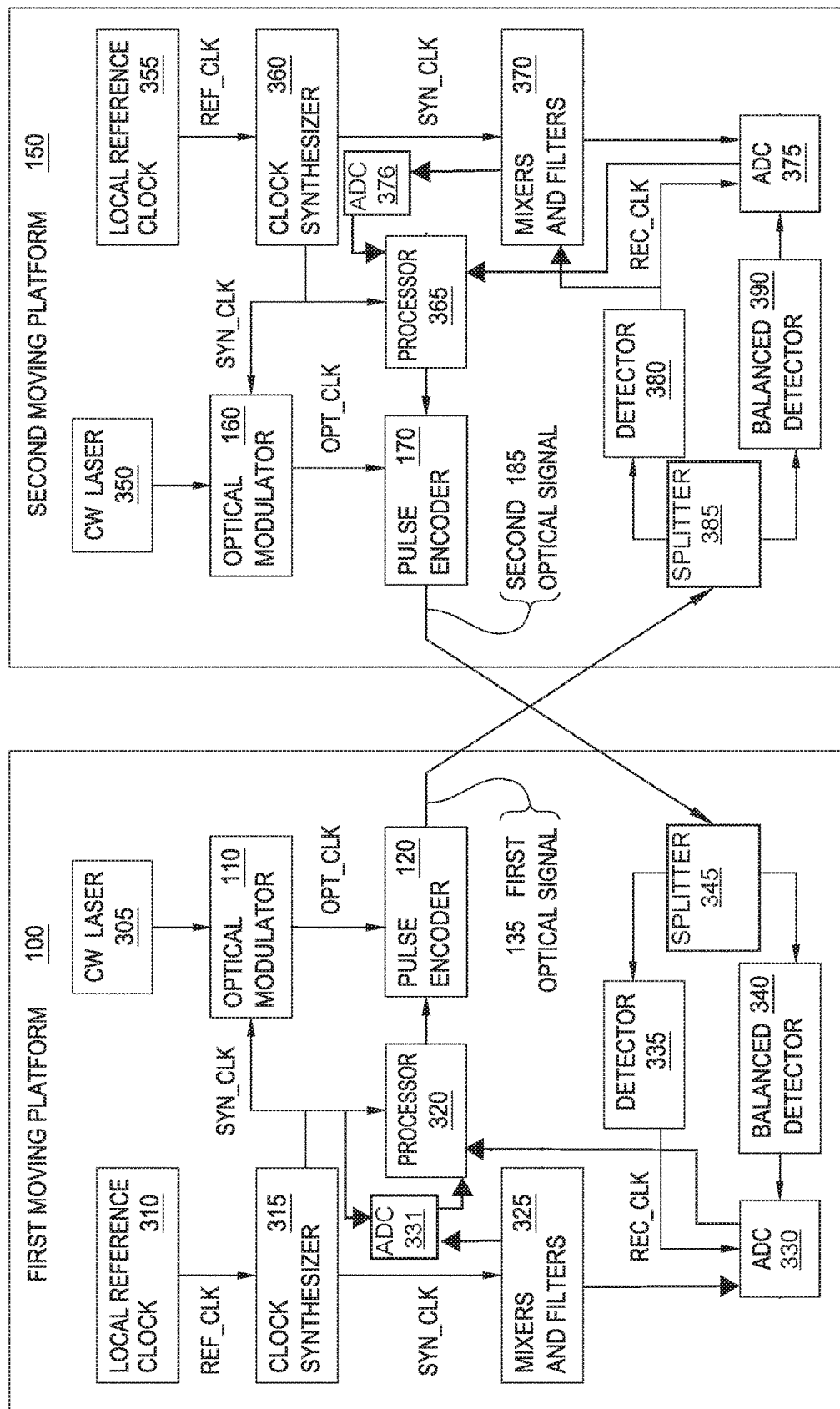
FIG. 3 illustrates a system for synchronizing clocks on two moving platforms.

FIG. 3 illustrates a system for synchronizing clocks on two moving platforms—i.e., the first moving platform 100 and the second moving platform 150—but can include any number of moving platforms. In this example, each of the moving platforms contains the same components which perform the same function, and thus, only the components in the first moving platform 100 are described.

The first moving platform 100 includes a continuous wave (CW) laser 305 which outputs a CW laser to the optical modulator 110. The CW laser 305 is one example of the optical source 105 shown in FIG. 1. The CW laser 305 outputs a sinusoidal optical signal which is received by the optical modulator 110. However, in other embodiments, a femtosecond laser may be used as the optical source 105 rather than a CW laser 305. In still another embodiment, instead of using optical signals, the system shown in FIG. 3 can be modified to use radio frequencies (e.g., wireless signals) to transmit the timestamp values, timing pulses or signals, and the offset data between the moving platforms 100 and 150.

The optical modulator 110 uses a synthesized clock (SYN_CLK) to convert the CW laser into an optical clock (OPT_CLK). In one aspect, the OPT_CLK includes a plurality of pulses that are spaced according to the frequency of the SYN_CLK.

The SYN_CLK is generated by a local reference clock 310 and a clock synthesizer 315 (which correspond to the clock generator 115 in FIG. 1). The local reference clock 310 may include an oscillator circuit for generating a local reference clock (REF_CLK). In one aspect, the REF_CLK may be synchronized with a global reference clock—e.g., a GPS reference clock or coordinated universal time (UTC). However, the local reference clock 310 may drift such that it is no longer synched with the global clock—e.g., the clock 310 can drift after an initial synchronization.

The clock synthesizer 315 uses the REF_CLK to generate the SYN_CLK. In one aspect, the SYN_CLK has a faster frequency than the REF_CLK. In this disclosure, it assumed that the REF_CLK is a 10 MHz clock signal while the SYN_CLK is a 1 GHz clock signal, although this is just one example. Moreover, in one aspect, the value of the SYN_CLK in the second moving platform 150 is different from the corresponding value in the first moving platform 100. For example, the SYN_CLK in the second moving platform 150 may be 0.99 GHz. However, while the SYN_CLKs for the first and second moving platforms 100 and 150 are different, the REF_CLKs for the two platforms may be the same or different. For example, the clock synthesizer 315 on the first moving platform 100 may be configured to use a 10 MHz REF_CLK to output a 1 GHz SYN_CLK while a clock synthesizer 360 on the second moving platform 150 uses a 10 MHz REF_CLK to output a 0.99 GHz SYN_CLK.

In one embodiment, in addition to using different frequencies, the wavelengths of the optical signals transmitted by the moving platforms 100 and 150 are different. By comparing the index of refraction between the two optical signals, the moving platforms 100 and 150 can determine the characteristics of the medium through which the optical signals travel (e.g., the air density) which can help the moving platforms 100 and 150 generate more accurate distance measurements.

The SYN_CLK is used by the optical modulator 110 to generate the OPT_CLK and by a processor 320 to control processing. In one aspect, the processor 320 can include a programmable logic device—e.g., a field-programmable gate array (FPGA)—or one or more integrated circuits—e.g., an application specific integrated circuit (ASIC). The processor 320 outputs control signals (e.g., via high speed transceivers) for encoding data onto the OPT_CLK using the pulse encoder 120. For example, the processor 320 can use the control signals to encode the preamble, timestamp values, phase offset values, and the like into the first optical signal 135 which is transmitted to the second moving platform 150. In another embodiment, in addition to generating the OPT_CLK, the optical modulator 110 can encode the data onto the OPT_CLK which means the pulse encoder 120 could be omitted.

In one aspect, the pulse encoder 120 uses differential phase shift keying to encode digital data into the OPT_CLK. For example, the encoder 120 can change the phase between 0 and 180 degrees where a change in phase between two adjacent pulses represents a change in the bit value. However, phase shift keying is just one suitable data encoding method for optical signals. In one aspect, the pulse encoder 120 receives sequences of bits (codes) from the processor 320 which control an amplifier for encoding digital data into the first optical signal 135.

The first moving platform 100 includes an optical splitter 345, a detector 335, a balanced detector 340, an analog-to-digital converter (ADC) 330, and mixers and optical and RF filters 325 for processing the second optical signal 185 which is received from the second moving platform 150. These components may correspond to the recovery module 130 illustrated in FIG. 1. Although not shown, the moving platforms 100 and 150 can include optical amplifiers which are used to amplify the received optical signals before the signals are transmitted to the optical splitters 345 and 385. The optical splitter 345 receives the second optical signal 185 and splits the power in the optical signal 185 along two different paths.

The output of the balanced detector 340 depends on the phase relationship between adjacent pulses and will have a reversed voltage if their phases are out of phase by 180 degrees. In one embodiment, the balanced detector 340 includes a delay line interferometer at its input (e.g., a Mach-Zehnder Interferometer) for comparing a current pulse with the adjacent (i.e., previous) pulse. In one embodiment, the interferometer performs differential phase shift keying to compare the previous pulse to the current pulse in order to identify differences between the pulses. The output of the balanced detector 340 is sampled by the ADC 330 at the rate of the incoming pulses which is determined by a recovered clock (REC_CLK) generated by the detector 335. In one aspect, the detector 335 (e.g., a photodetector) responds much faster than the incoming pulse rate, and thus, its output can be used as a clock signal. Although not shown, in one aspect, the output of the detector 335 drives a clock recovery circuit or synthesizer to produce a consistent REC_CLK when the received second optical signal 185 is intermittent.

As described below, the samples generated by the ADC 330 and the REC_CLK can be mixed with the SYN_CLK and the REF_CLK on the first moving platform 100 using the mixers and filters 325 and the processor 320 to generate coarse and fine phase offsets—i.e., time differences. The mixers 325 output a trigger or signal to the ADC 330 and an ADC 331 in parallel in response to a timing event (e.g., when the SYN_CLK and the REC_CLK are in phase). In this embodiment, the ADC 330 is driven by the REC_CLK (0.99 GHz in one example) but the ADC 331 is driven by SYN_CLK (e.g., 1 GHz in one example). Nonetheless, the mixers 325 output the same signal to the ADCs 330 and 331 when the SYN_CLK and the REC_CLK are in phase which synchronizes the ADCs 330 and 331 (which operate a different speeds) and aids the processor 320 to correctly combine the coarse and fine phase offsets.

In one aspect, the components in the first and second moving platforms 100 and 150 are commercial-off-the-shelf (COTS) components. Thus, the time synchronization and distance measurement techniques described herein can be achieved without customized hardware which can reduce the cost of the overall system when compared to TWTT systems that use specialized or actively controlled complex components such as femtosecond lasers which are used in TWTT techniques different than described above such as Pulse Repetition Frequency (PRF) adjustment. As mentioned above, a CW laser 350, a local reference clock 355, a clock synthesizer 360, a processor 365, mixers and filters 370, an ADC 375, an ADC 376, a detector 380, a delay 385, and a balanced detector 390 in the second moving platform 150 function similar to their counterparts shown in the first moving platform 100 albeit the components in the second moving platform 150 may have different parameters such as different clock values, different pulse rates, or optical signals with different wavelengths.

FIG. 4 is a flowchart of a method 400 for using determining coarse and fine phase offsets between clocks on two moving platforms. At block 405, the first moving platform identifies a coarse phase offset using the timestamp value received from the second moving platform. In one aspect, the coarse phase measurement is obtained by differencing the received timestamp value and the local clock time when the corresponding timing pulse was received. The resolution of the coarse phase offset is dependent on the resolution of the local and recovered clocks (i.e., REF_CLK, SYN_CLK, and REC_CLK). For example, a local clock based on the ADC 330 on the first moving platform 100 driven by a 0.99 GHz REC_CLK signal has a sampling rate of 1.01 nanoseconds (since the SYN_CLK of the second moving platform 150 is 0.99 GHz which controls the pulse rate of the second optical signal 185). If this is compared to the ADC 375 on the second moving platform 150, which has a sampling rate of 1 nanosecond since the REC_CLK is 1 GHz, the difference between the timestamps measured at each 1 GHz clock cycle for two perfectly synchronized clocks varies between zero and one nanosecond. Thus, while the coarse phase offset is accurate up to one nanosecond in this example by differencing the timestamps, a fine phase offset is needed to identify a sub-nanosecond phase offset. However, the accuracy of the coarse phase offset will vary depending on the speed of the clocks used. For example, the coarse phase offset may be less accurate if slower clocking signals are used but more accurate if faster clocking signals are used.

At block 410, the first moving platform identifies a fine phase offset using the recovered clock (REC_CLK) from the second optical signal. Moreover, the second moving platform identifies a fine phase offset using the REC_CLK derived from the first optical signal. One system or technique for identifying the fine phase offset is shown in FIG. 5.

Figure 5:
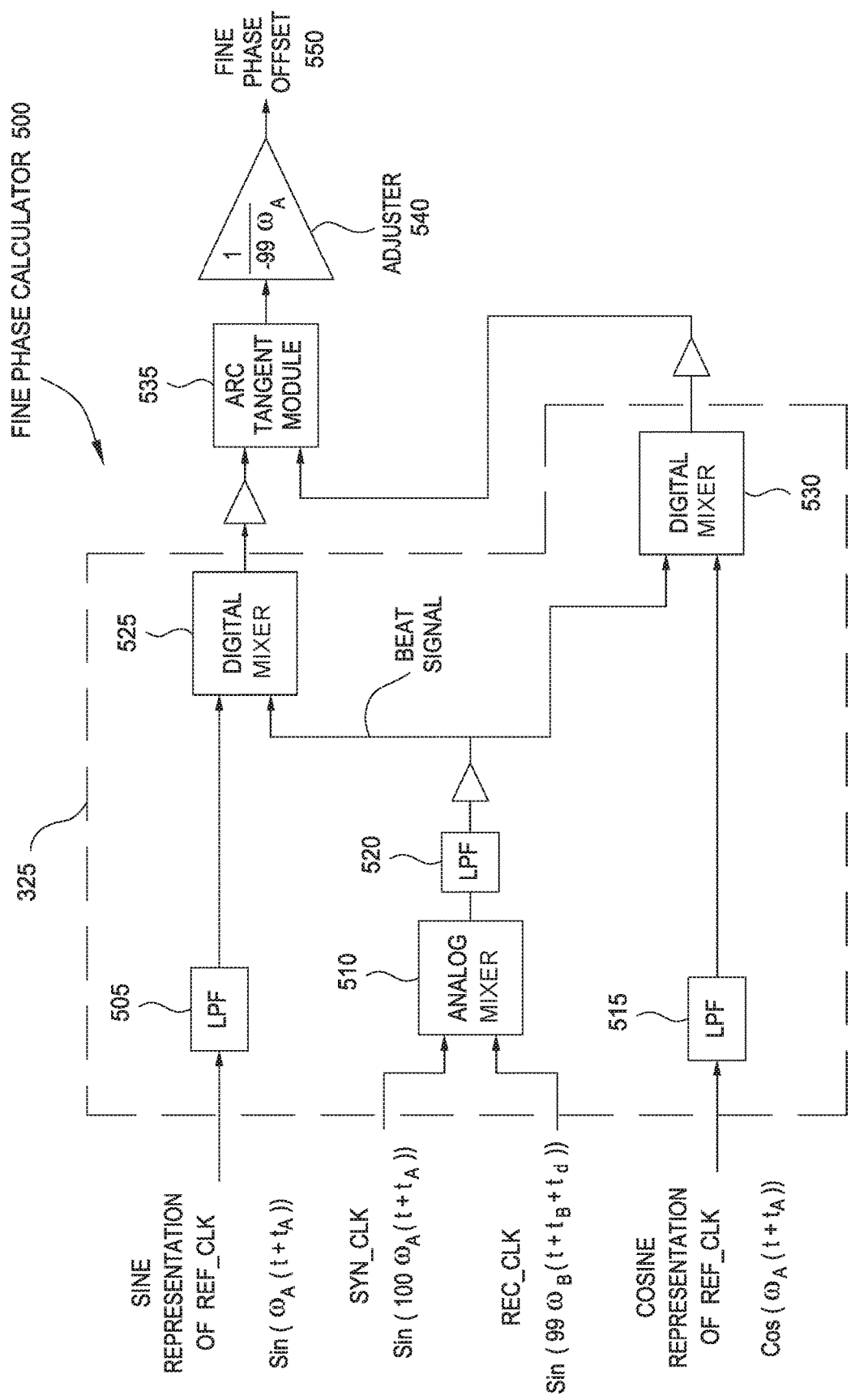
FIG. 5 illustrates a fine phase calculator.

FIG. 5 illustrates a fine phase calculator 500 for generating the fine phase offset. The fine phase calculator 500 includes four inputs: a sine representation of the REF_CLK ($\sin(\omega_A(t+t_A))$ where $\omega_A=2\pi*$ REF_CLK), the SYN_CLK, the REC_CLK, and a cosine representation of the REF_CLK ($\cos(\omega_A(t+t_A))$). The variable $t_A$ represents the offset between the time of the REF_CLK and a global clock (e.g., GPS or UTC).

The SYN_CLK (e.g., a 1 GHz signal if the calculator 500 is disposed on the first moving platform) is mixed using an analog mixer 510 with the REC_CLK (e.g., a 0.99 GHz signal recovered from the optical signal transmitted by the second moving platform). Because the first and second moving platforms have SYN_CLKs at different frequencies (with a difference of 10 MHz in this example), mixing the SYN_CLK and the REC_CLK results in a 10 MHz beat signal (also referred to as an intermediate signal or intermediate frequency) as well as other higher order frequencies. Mixing the two signals would not result in obtaining the beat signal if the SYN_CLKs in the two moving platforms were the same frequencies rather than being different frequencies. A low pass filter (LPF) removes higher frequency mixer products so that only the 10 MHz beat signal is outputted by the LPF 520 to a buffer or amplifier which, in this example, is the same frequency as the REF$_{CLK}$.

The beat signal resulting from mixing the SYN_CLK and the REC_CLK is then mixed with the sine and cosine representations of the REF_CLK after these signals pass through LPFs 505 and 515, respectively. In this example, instead of using an analog mixer, the beat signal can be mixed with the sine and cosine representations of the REF_CLK using digital mixers 525 and 530 which can be performed in the processor 320 (e.g., an FPGA). For example, the beat signal can be sampled using an ADC that is triggered by the SYN_CLK (e.g., 1 GHz signal). Sine and cosine lookup tables can be indexed using the SYN_CLK derived from counting 1 GHZ ADC samples. The resulting mixed signals outputted by the mixers 525 and 530 indicate the offset between the beat signal and the REF_CLK. Using both sine and cosine representations of the REF_CLK helps to remove error relative to when only one of these signals is mixed with the beat signal.

The outputs of the mixers 525 and 530 are buffered and received at an arctangent module 535. Performing the arctangent of the inputs divides out amplitude variations in the signals so the results are more accurate and the local clock frequencies (i.e., $\omega_A$ and $\omega_B$) are assumed to be captured in the offset terms. The arctangent module 535 outputs a signal which is a function of the offsets of the REF_CLKs (i.e., $t_A$ and $t_B$) in both moving platforms relative to a global clock, a transmission delay ($t_d$) due to the distance between the moving platforms, and the local clock frequencies (i.e., $\omega_A$ and $\omega_B$). However, the local clock frequencies are assumed to cancel.

An adjuster 540 performs an operation on the output of the arctangent module 535 as shown in Equation 1:

$$G = \frac{1}{-99\omega_A} \quad (1)$$

The output of the adjuster 540 is the fine phase offset 550. Note that the period of the sine and cosine signals inputted into the arctangent module 535 is a function of the frequency of the REC_CLK (e.g., 0.99 GHz in this example) and not the local frequency meaning that the output of the arctangent function cycles between $-\pi$ and $\pi$ as the leading edge of the REF_CLK slides past the leading edge of the REC_CLK, and not the other way around.

Returning to method 400, at block 415, the moving platforms resolve a clock cycle ambiguity of the coarse phase offset. For example, the coarse phase offset may suffer from cycle ambiguity which can cause the coarse phase offset to be off by one clock cycle—e.g., one nanosecond for a 1 GHz clock. The cycle ambiguity arises because the SYN_CLK and the REC_CLK have different frequencies (e.g., 1 GHz and 0.99 GHz). The leading edges of both clocks cross each other at the frequency of the beat signal (e.g., 10 GHz). The SYN_CLK and the REC_CLK increment on their respective leading edges (as the signal sign changes from negative to positive). If the coarse phase offset is computed at the moving platforms when the leading edges of the SYN_CLK and REC_CLK cross, the timing error resulting from the clocks incrementing at different times is at a minimum. Put differently, if the coarse phase offset is calculated when the clock edges of the SYN_CLK and the REC_CLK overlap or align (or at least when they are at a minimum offset), the resulting coarse offset measurement does not suffer from cycle ambiguity. For example, there are 100 clock cycles over a 10 MHz beat signal which means the time between edges increments by 10 picoseconds on each clock cycle. This means that the clock edges are within at least 5 picoseconds of each other at the minimum offset (ignoring platform motion since relative motion of 300 m/s for 1 nanosecond results in light arriving 1 femtosecond earlier). The 5 picosecond value is well within the clock cycle ambiguity since $-\pi$ to $+\pi$ yields $-0.5$ nanosecond to $0.5$ nanosecond uncertainty at 1 GHz.

There are at least two techniques for resolving the cycle ambiguity for the coarse phase offset. In each of these techniques, the fine phase offset is corrected by adding or subtracting the correct number of increments (e.g., $2\pi$ increments) until the solution approximately equals the coarse phase offset derived at block 405. The motion of the moving platforms and dynamic circuits (e.g., synthesizer phase lock loop, filters, etc.) can increase the error slightly. As such, errors bounds are applied to the coarse phase offset and used to determine how many $2\pi$ increments should be added to the fine phase offset so that the resulting fine phase offset falls within the error bounds. Referring to FIG. 3, the mixers 325 can output a synchronization signal to the ADCs 330 and 331 in parallel in response to a common event such as when the then SYN_CLK and the REC_CLK are in phase (or when a D flip-flop is triggered as described below).

In the first resolution technique, the moving platforms identify the minimum and maximum differences between the SYN_CLK and the REF_CLK at every SYN_CLK cycle over a predefined window of time. In one aspect, the length of the window of time is long enough to guarantee that the samples captured during the window contain the minimum difference between the clocks. That is, the window of time is as long as (or greater than) one cycle of the beat signal—e.g., 10 MHz or 100 ns in the examples above. Overlapping windows can be used.

However, one potential drawback of using predefined windows is the amount of compute resources required to calculate the differences between the SYN_CLK and the REF_CLK for a window (e.g., 100 ns) when data is arriving, and is stored, at a rate of 1 GHz. In one aspect, the moving platforms may contain separate computing resources (besides processor or FPGAs as described above) for storing and processing the data in order to determine the differences between the SYN_CLK and the REF_CLK.

In the second resolution technique, the moving platforms mix the SYN_CLK and REF_CLK to identify the time at which the coarse clock difference error is at a minimum (i.e., the leading edge of the beat signal). In this aspect, the coarse clock difference is stored (at the beat frequency which can be much slower than the SYN_CLK and the REC_CLK) and used to correct the fine phase measurement by adding or subtracting the correct number of clock cycles to reach the coarse phase offset within the applied error bounds.

There are at least three ways to mix the SYN_CLK and the REC_CLK signals when using the second technique. The moving platforms can use analog mixing to create a sampling trigger, use the processor or FPGA to digitally mix the clocks, or use a D flip-flop which can be external to the processor or FPGA. If a D flip-flop is used, its output goes high when the leading clock edges of the SYN_CLK and the REC_CLK cross. The D flip-flop (which can be used to provide a mixer in the digital domain) is sampled by the two ADCs in the moving platform (which, for example, operate at 0.99 GHz and 1 GHz). In another embodiment, the D flip-flop can be replaced by an analog mixer output. The ADC samples are buffered and then a small number of samples are stored each time the output of the D flip-flop goes high. The buffer catches samples that occur immediately before and after the output of the D flip-flop goes high which corresponds to when the difference between the SYN_CLK and the REC_CLK is at a minimum, thereby resolving any ambiguity in the coarse phase offset. As stated above, the fine phase offset is then adjusted by adding or subtracting the correct number of $2\pi$ increments until the solution approximately equals the coarse solution (within the error bounds).

At block 420, the first moving platform combines the coarse phase offset with the fine phase offset 550 to generate the first phase offset described in method 200. The second moving platform can perform a similar process to generate the second phase offset in method 200. Using the specific clock values above, the coarse phase offset indicates the offset of the SYN_CLKs within one nanosecond which can be added to a sub-nanosecond adjustment provided by the fine phase offset 550. After the coarse and fine phase offsets are combined to yield a total phase offset, at block 425, the moving platforms identify the actual phase offset between the first and second clocks (e.g., a 10 MHz reference clock in both the first and second moving platforms or the 1 GHz and 0.99 GHz signals that drive the ADCs since each sample represents an increment of time) and the distance between the first and second moving platforms using the first and second phase offsets. That is, the moving platforms share the combined or total phase offsets determined at block 420 with each other. As explained above, with the phase offsets, the moving platforms have two solutions for two unknowns—i.e., the actual phase offset in the clocks and the transmission delay due to the distance between the moving platforms. By solving this two variable system, the moving platforms can, in parallel, determine the portion of the total phase offset due to the local clocks being misaligned and the portion of the total phase offset due to transmission delay because of the distance separating the moving platforms. In the example above, the total phase offset can be provided at a rate of 10 MHz.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor comprising hardware and software to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices comprising hardware and software from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, the disclosure comprises examples according to the following clauses:

Clause 1. A method for communicating between moving platforms, the method comprising: transmitting a first optical signal from a first moving platform to a second moving platform, the first optical signal comprising modulated data (i) indicating a first timestamp for a first clock operating in the first moving platform at a first frequency and (ii) identifying a timing pulse in the first optical signal indicating when the first clock is at the first timestamp; receiving, at the first moving platform, a second optical signal transmitted by the second moving platform, the second optical signal comprising modulated data (i) indicating a second timestamp for a second clock operating in the second moving platform at a second frequency different from the first frequency and (ii) identifying a timing pulse in the second optical signal indicating when the second clock is at the second timestamp; determining a first phase offset between the first clock and the second clock by evaluating the second timestamp; transmitting the first phase offset from the first moving platform to the second moving platform; receiving, at the first moving platform, a second phase offset transmitted by the second moving platform, wherein the second phase offset defines an offset between the first clock and the second clock relative to the second moving platform and is based on the first timestamp; and synchronizing the first clock and the second clock at the first moving platform based on the first and second phase offsets.

Clause 2. The method of clause 1, wherein determining the first phase offset between the first clock and the second clock comprises: identifying a coarse phase offset and a fine phase offset, wherein a value of the fine phase offset is less than a clock cycle of the second clock; and combining the coarse phase offset and the fine phase offset to yield the first phase offset.

Clause 3. The method of clause 2, wherein identifying the fine phase offset comprises: recovering the second clock at the first moving platform based on the second optical signal; mixing the recovered clock with the first clock to identify an intermediate signal; and mixing the intermediate signal with a local reference clock in the first moving platform to identify the fine phase offset, wherein the first clock is synthesized from the local reference clock.

Clause 4. The method of clause 3, wherein mixing the intermediate signal with the local reference clock comprises: mixing the intermediate signal with a sine representation of the local reference clock to generate a first offset error; mixing the intermediate signal with a cosine representation of the local reference clock to generate a second offset error; and combining the first and second offset errors to generate the fine phase offset.

Clause 5. The method of clause 2, further comprising: recovering the second clock at the first moving platform based on the second optical signal; identifying a difference between an edge of the first clock and an edge of the second clock over a predefined window of time greater than or equal to a beat period of local reference clock used to synthesize the first clock; and identifying an adjustment for the fine phase offset based on when the time difference between the edges of the first and second clocks is at a minimum.

Clause 6. The method of clause 2, further comprising: monitoring a flip-flop to determine when an edge of the first clock and an edge of the second clock cross; identifying samples of the second optical signal captured at the first moving platform corresponding to when the edges of the first and second clocks cross; and identifying an adjustment for the coarse phase offset based on the identified samples.

Clause 7. The method of clause 1, wherein the modulated data comprises a predefined preamble transmitted before the first timestamp.

Clause 8. A first moving platform, comprising: a pulse encoder configured to transmit a first optical signal from a first moving platform to a second moving platform, the first optical signal comprising modulated data (i) indicating a first timestamp for a first clock operating in the first moving platform at a first frequency and (ii) identifying a timing pulse in the first optical signal indicating when the first clock is at the first timestamp; a recovery module configured to receive a second optical signal transmitted by the second moving platform, the second optical signal comprising modulated data (i) indicating a second timestamp for a second clock operating in the second moving platform at a second frequency different from the first frequency and (ii) identifying a timing pulse in the second optical signal indicating when the second clock is at the second timestamp; and control logic configured to determine a first phase offset between the first clock and the second clock by evaluating the second timestamp, wherein the pulse encoder is further configured to transmit the first phase offset from the first moving platform to the second moving platform and the recovery module is further configured to receive a second phase offset transmitted by the second moving platform, wherein the second phase offset defines an offset between the first clock and the second clock relative to the second moving platform and is based on the first timestamp, and wherein the control logic is configured to synchronize the first clock and the second clock at the first moving platform based on the first and second phase offsets.

Clause 9. The first moving platform of clause 8, wherein determining the first phase offset between the first clock and the second clock comprises: identifying a coarse phase offset and a fine phase offset, wherein a value of the fine phase offset is less than a clock cycle of the second clock; and combining the coarse phase offset and the fine phase offset to yield the first phase offset.

Clause 10. The first moving platform of clause 9, wherein identifying the fine phase offset comprises: recovering the second clock at the first moving platform based on the second optical signal; mixing the recovered clock with the first clock to identify an intermediate signal; and mixing the intermediate signal with a local reference clock in the first moving platform to identify the fine phase offset, wherein the first clock is synthesized from the local reference clock.

Clause 11. The first moving platform of clause 10, wherein mixing the intermediate signal with the local reference clock comprises: mixing the intermediate signal with a sine representation of the local reference clock to generate a first offset error; mixing the intermediate signal with a cosine representation of the local reference clock to generate a second offset error; and combining the first and second offset errors to generate the fine phase offset.

Clause 12. The first moving platform of clause 9, wherein the recovery module is configured to recover the second clock at the first moving platform based on the second optical signal, and wherein the control logic is configured to: identify a difference between an edge of the first clock and an edge of the second clock over a predefined window of time greater than or equal to a beat period of local reference clock used to synthesize the first clock, and identify an adjustment for the fine phase offset based on when the difference between the edges of the first and second clocks is at a minimum.

Clause 13. The first moving platform of clause 9, wherein the control logic is configured to: monitor a flip-flop to determine when an edge of the first clock and an edge of the second clock cross; identify samples of the second optical signal captured at the first moving platform corresponding to when the edges of the first and second clocks cross; and identify an adjustment for the coarse phase offset based on the identified samples.

Clause 14. The first moving platform of clause 8, wherein the modulated data comprises a predefined preamble transmitted before the first timestamp.

Clause 15. A non-transitory computer-readable storage medium storing instructions, which when executed on one or more processing devices, perform an operation for synchronizing a first clock in a first moving platform to a second clock in a second moving platform, the operation comprises: instructing a pulse encoder to transmit a first optical signal from the first moving platform to the second moving platform, the first optical signal comprising modulated data (i) indicating a first timestamp for the first clock operating in the first moving platform at a first frequency and (ii) identifying a timing pulse in the first optical signal indicating when the first clock is at the first timestamp; decoding, at the first moving platform, a second optical signal transmitted by the second moving platform, the second optical signal comprising modulated data (i) indicating a second timestamp for the second clock operating in the second moving platform at a second frequency different from the first frequency and (ii) identifying a timing pulse in the second optical signal indicating when the second clock is at the second timestamp; determining a first phase offset between the first clock and the second clock by evaluating the second timestamp; instructing the pulse encoder to transmit the first phase offset from the first moving platform to the second moving platform; decoding, at the first moving platform, a second phase offset transmitted by the second moving platform, wherein the second phase offset defines an offset between the first clock and the second clock relative to the second moving platform and is based on the first timestamp; and synchronizing the first clock and the second clock at the first moving platform based on the first and second phase offsets.

Clause 16. The computer-readable storage medium of clause 15, wherein determining the first phase offset between the first clock and the second clock comprises: identifying a coarse phase offset and a fine phase offset, wherein a value of the fine phase offset is less than a clock cycle of the second clock; and combining the coarse phase offset and the fine phase offset to yield the first phase offset.

Clause 17. The computer-readable storage medium of clause 16, wherein identifying the fine phase offset comprises: recovering the second clock at the first moving platform based on the second optical signal; mixing the recovered clock with the first clock to identify an intermediate signal; and mixing the intermediate signal with a local reference clock in the first moving platform to identify the fine phase offset, wherein the first clock is synthesized from the local reference clock.

Clause 18. The computer-readable storage medium of clause 17, wherein mixing the intermediate signal with the local reference clock comprises: mixing the intermediate signal with a sine representation of the local reference clock to generate a first offset error; mixing the intermediate signal with a cosine representation of the local reference clock to generate a second offset error; and combining the first and second offset errors to generate the fine phase offset.

Clause 19. The computer-readable storage medium of clause 16, wherein the operation further comprises: recovering the second clock at the first moving platform based on the second optical signal; identifying a difference between an edge of the first clock and an edge of the second clock over a predefined window of time greater than or equal to a beat period of local reference clock used to synthesize the first clock; and identifying an adjustment for the fine phase offset based on when the difference between the edges of the first and second clocks is at a minimum.

Clause 20. The computer-readable storage medium of clause 16, wherein the operation further comprises: monitoring a flip-flop to determine when an edge of the first clock and an edge of the second clock cross; identifying samples of the second optical signal captured at the first moving platform corresponding to when the edges of the first and second clocks cross; and identifying an adjustment for the coarse phase offset based on the identified samples.

While the foregoing is directed to aspects, other and further aspects may be devised without departing from the basic scope thereof, and the scope thereof is determined by the claims that follow.

What is claimed is:

1. A method for mixing an intermediate signal with a local reference clock when communicating between moving platforms, the method comprising:
    transmitting a first wireless signal from a first moving platform to a second moving platform, the first wireless signal comprising modulated data (i) indicating a first timestamp including a first timestamp value for a first clock operating in the first moving platform at a first frequency and (ii) identifying a timing pulse in the first wireless signal indicating when the first clock is at the first timestamp value;
    receiving, at the first moving platform, a second wireless signal transmitted by the second moving platform, the second wireless signal comprising modulated data (i) indicating a second timestamp for a second clock operating in the second moving platform at a second frequency different from the first frequency and (ii) identifying a timing pulse in the second wireless signal indicating when the second clock is at the second timestamp;
    determining a first phase offset between the first clock and the second clock by evaluating the second timestamp; wherein determining the first phase offset between the first clock and the second clock comprises:

identifying a coarse phase offset and a fine phase offset, wherein a value of the fine phase offset is less than a clock cycle of the second clock;
wherein identifying the fine phase offset comprises:
recovering the second clock at the first moving platform based on the second wireless signal;
mixing the recovered clock with the first clock to identify the intermediate signal; and
mixing the intermediate signal with the local reference clock in the first moving platform to identify the fine phase offset, wherein the first clock is synthesized from the local reference clock; and
combining the coarse phase offset and the fine phase offset to yield the first phase offset;
transmitting the first phase offset from the first moving platform to the second moving platform;
receiving, at the first moving platform, a second phase offset transmitted by the second moving platform, wherein the second phase offset defines an offset between the first clock and the second clock relative to the second moving platform and is based on the first timestamp value; and
synchronizing the first clock and the second clock at the first moving platform based on the first and second phase offsets,
wherein mixing the intermediate signal with the local reference clock comprises:
mixing the intermediate signal with a sine representation of the local reference clock to generate a first offset error;
mixing the intermediate signal with a cosine representation of the local reference clock to generate a second offset error; and
combining the first and second offset errors to generate the fine phase offset.

2. A method for generating a fine phase offset when communicating between moving platforms, the method comprising:
transmitting a first wireless signal from a first moving platform to a second moving platform, the first wireless signal comprising modulated data (i) indicating a first timestamp including a first timestamp value for a first clock operating in the first moving platform at a first frequency and (ii) identifying a timing pulse in the first wireless signal indicating when the first clock is at the first timestamp value;
receiving, at the first moving platform, a second wireless signal transmitted by the second moving platform, the second wireless signal comprising modulated data (i) indicating a second timestamp including a second timestamp value for a second clock operating in the second moving platform at a second frequency different from the first frequency and (ii) identifying a timing pulse in the second wireless signal indicating when the second clock is at the second timestamp value;
determining a first phase offset between the first clock and the second clock by evaluating the second timestamp value;
wherein determining the first phase offset between the first clock and the second clock comprises:
identifying a coarse phase offset and a fine phase offset, wherein a value of the fine phase offset is less than a clock cycle of the second clock; and
combining the coarse phase offset and the fine phase offset to yield the first phase offset;

recovering the second clock at the first moving platform based on the second wireless signal;
identifying a difference between an edge of the first clock and an edge of the second clock over a predefined window of time greater than or equal to a beat period of a local reference clock used to synthesize the first clock;
identifying an adjustment for the fine phase offset based on when the difference between the edges of the first and second clocks is at a minimum;
transmitting the first phase offset from the first moving platform to the second moving platform;
receiving, at the first moving platform, a second phase offset transmitted by the second moving platform, wherein the second phase offset defines an offset between the first clock and the second clock relative to the second moving platform and is based on the first timestamp value; and
synchronizing the first clock and the second clock at the first moving platform based on the first and second phase offsets.

3. The method of claim 2, further comprising:
monitoring a flip-flop to determine when an edge of the first clock and an edge of the second clock cross;
identifying samples of the second wireless signal captured at the first moving platform corresponding to when the edges of the first and second clocks cross; and
identifying an adjustment for the coarse phase offset based on the identified samples.

4. A first moving platform for mixing an intermediate signal with a local reference clock, the first moving platform comprising:
a pulse encoder configured to transmit a first wireless signal from the first moving platform to a second moving platform, the first wireless signal comprising modulated data (i) indicating a first timestamp including a first timestamp value for a first clock operating in the first moving platform at a first frequency and (ii) identifying a timing pulse in the first wireless signal indicating when the first clock is at the first timestamp value;
a recovery module configured to receive a second wireless signal transmitted by the second moving platform, the second wireless signal comprising modulated data (i) indicating a second timestamp including a second timestamp value for a second clock operating in the second moving platform at a second frequency different from the first frequency and (ii) identifying a timing pulse in the second wireless signal indicating when the second clock is at the second timestamp value; and
control logic configured to determine a first phase offset between the first clock and the second clock by evaluating the second timestamp value,
wherein the pulse encoder is further configured to transmit the first phase offset from the first moving platform to the second moving platform and the recovery module is further configured to receive a second phase offset transmitted by the second moving platform, wherein the second phase offset defines an offset between the first clock and the second clock relative to the second moving platform and is based on the first timestamp value,
wherein determining the first phase offset between the first clock and the second clock comprises:
identifying a coarse phase offset and a fine phase offset, wherein a value of the fine phase offset is less than a clock cycle of the second clock, and wherein identifying the fine phase offset comprises:
recovering the second clock at the first moving platform based on the second wireless signal;
mixing the recovered clock with the first clock to identify the intermediate signal; and
mixing the intermediate signal with the local reference clock in the first moving platform to identify the fine phase offset, wherein the first clock is synthesized from the local reference clock; and combining the coarse phase offset and the fine phase offset to yield the first phase offset, and wherein the control logic is configured to synchronize the first clock and the second clock at the first moving platform based on the first and second phase offsets, wherein mixing the intermediate signal with the local reference clock comprises:
mixing the intermediate signal with a sine representation of the local reference clock to generate a first offset error;
mixing the intermediate signal with a cosine representation of the local reference clock to generate a second offset error; and
combining the first and second offset errors to generate the fine phase offset.

5. A first moving platform for recovering a second clock based on a second wireless signal, the first moving platform comprising:
a pulse encoder comprising circuitry configured to transmit a first wireless signal from the first moving platform to a second moving platform, the first wireless signal comprising modulated data (i) indicating a first timestamp including a first timestamp value for a first clock operating in the first moving platform at a first frequency and (ii) identifying a timing pulse in the first wireless signal indicating when the first clock is at the first timestamp value;
a recovery module comprising circuitry configured to receive the second wireless signal transmitted by the second moving platform, the second wireless signal comprising modulated data (i) indicating a second timestamp including a second timestamp value for the second clock operating in the second moving platform at a second frequency different from the first frequency and (ii) identifying a timing pulse in the second wireless signal indicating when the second clock is at the second timestamp value; and
control logic configured to determine a first phase offset between the first clock and the second clock by evaluating the second timestamp value,
wherein determining the first phase offset between the first clock and the second clock comprises:
identifying a coarse phase offset and a fine phase offset, wherein a value of the fine phase offset is less than a clock cycle of the second clock; and
combining the coarse phase offset and the fine phase offset to yield the first phase offset, wherein the pulse encoder is further configured to transmit the first phase offset from the first moving platform to the second moving platform and the recovery module is further configured to receive a second phase offset transmitted by the second moving platform, wherein the second phase offset defines an offset between the first clock and the second clock relative to the second moving platform and is based on the first timestamp value, and wherein the control logic is configured to synchronize the first clock and the second clock at the first moving platform based on the first and second phase offsets, wherein the recovery module is configured to recover the second clock at the first moving platform based on the second wireless signal, and
wherein the control logic is configured to:
identify a difference between an edge of the first clock and an edge of the second clock over a predefined window of time greater than or equal to a beat period of local reference clock used to synthesize the first clock, and
identify an adjustment for the fine phase offset based on when the difference between the edges of the first and second clocks is at a minimum.

6. The first moving platform of claim 5, wherein the control logic is configured to:
monitor a flip-flop to determine when an edge of the first clock and an edge of the second clock cross;
identify samples of the second wireless signal captured at the first moving platform corresponding to when the edges of the first and second clocks cross; and
identify an adjustment for the coarse phase offset based on the identified samples.

* * * * *